United States Patent [19]
Gonas et al.
[11] 4,147,522
[45] Apr. 3, 1979

[54] ELECTROSTATIC DUST COLLECTOR

[75] Inventors: Edward J. Gonas, Tonawanda; Dennis J. Helfritch, N. Tonawanda, both of N.Y.

[73] Assignee: American Precision Industries Inc., Buffalo, N.Y.

[21] Appl. No.: 679,857

[22] Filed: Apr. 23, 1976

[51] Int. Cl.[2] .................... B01D 46/04; B01D 50/00; B01D 53/32; B03C 3/80

[52] U.S. Cl. .................... 55/6; 55/12; 55/96; 55/97; 55/117; 55/124; 55/146; 55/154; 55/272; 55/303; 55/341 NT; 55/372; 55/467; 55/DIG. 38

[58] Field of Search .................... 55/6, 12, 96, 97, 108, 55/117, 124, 146, 154, 155, 301-304, 318, 343, 350, 372, DIG. 38, 273, 284, 293, 131, 137, 138, 282, 315, 341 R, 341 NT, 272, 467

[56] References Cited

U.S. PATENT DOCUMENTS

| | | | |
|---|---|---|---|
| 1,853,393 | 4/1932 | Anderson | 55/6 |
| 2,275,001 | 3/1942 | Anderson | 55/DIG. 38 X |
| 2,672,947 | 3/1954 | Klemperer | 55/111 |
| 2,712,362 | 7/1955 | Winklepleck | 55/DIG. 38 X |
| 2,797,429 | 7/1957 | Jensen et al. | 55/117 X |
| 3,722,182 | 3/1973 | Gilbertson | 55/124 |
| 3,765,152 | 10/1973 | Pausch | 55/302 X |
| 3,816,979 | 6/1974 | Wales | 55/96 |
| 3,915,676 | 10/1975 | Reed et al. | 55/124 X |
| 3,999,968 | 12/1976 | Brookman | 55/341 NT X |

FOREIGN PATENT DOCUMENTS

| | | | |
|---|---|---|---|
| 611137 | 10/1948 | United Kingdom | 55/137 |
| 812244 | 4/1959 | United Kingdom | 55/283 |

*Primary Examiner*—Frank W. Lutter
*Assistant Examiner*—Kathleen J. Prunner
*Attorney, Agent, or Firm*—Christel & Bean

[57] ABSTRACT

A method and apparatus for separating particulate matter from a gas stream wherein dirty gas is moved through an electrostatic charging zone such as an electrostatic precipitator and then is moved through a filter of foraminous material such as a fabric filter of the bag type. The filter is in fluid communication with the charging zone and electrically insulated therefrom. Collected particulate material on surfaces of the charging zone or precipitator and on the filter is removed by introducing a controlled quantity of high pressure gas at predetermined times adjacent the outlet of the charging zone or precipitator and in a direction toward the inlet thereof in a manner inducing a substantial flow of the cleaned gas through the apparatus in a reverse direction.

14 Claims, 10 Drawing Figures

ELECTROSTATIC DUST COLLECTOR

BACKGROUND OF THE INVENTION

This invention relates to the art of dust collection, and more particularly to a new and improved method and apparatus of the electrostatic type for separating particulate matter from a gas stream.

Dust collection methods and apparatus of the electrostatic type such as electrostatic precipitation are well known and offer the advantage of handling relatively heavy dust loads. Dust collection methods and apparatus of the mechanical filtration type which employ a porous filter medium, such as fabric filters or bag houses, provide a very efficient collection of small particles. It would be highly advantageous to provide a dust collection method and apparatus which combines the various desirable features of these two types. Furthermore, it would be highly desirable to provide an efficient and effective method and apparatus for cleaning or otherwise removing collected dust from surfaces of apparatus of the foregoing types.

SUMMARY OF THE INVENTION

It is, therefore, an object of this invention to provide a new and improved method and apparatus for collecting dust advantagously combining various desirable features of the electrostatic and mechanical filtration types.

It is a further object of this invention to provide a method and apparatus for cleaning collected dust from surfaces of apparatus of the elecrostatic type.

The present invention provides a method and apparatus for separating particulate matter from a gas stream wherein dirty gas is moved through an electrostatic charging zone such as that provided by an electrostatic precipitator and then is moved through a filter means of flexible foraminous material such as a fabric filter of the bag type which is electrically insulated with respect to the electrostatic charging zone. Collected particulate material on surfaces of the charging zone and the filter means is removed by introducing a controlled quantity of high pressure gas at predetermined times and at a location to induce a substantial flow of gas through the apparatus in a reverse direction.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
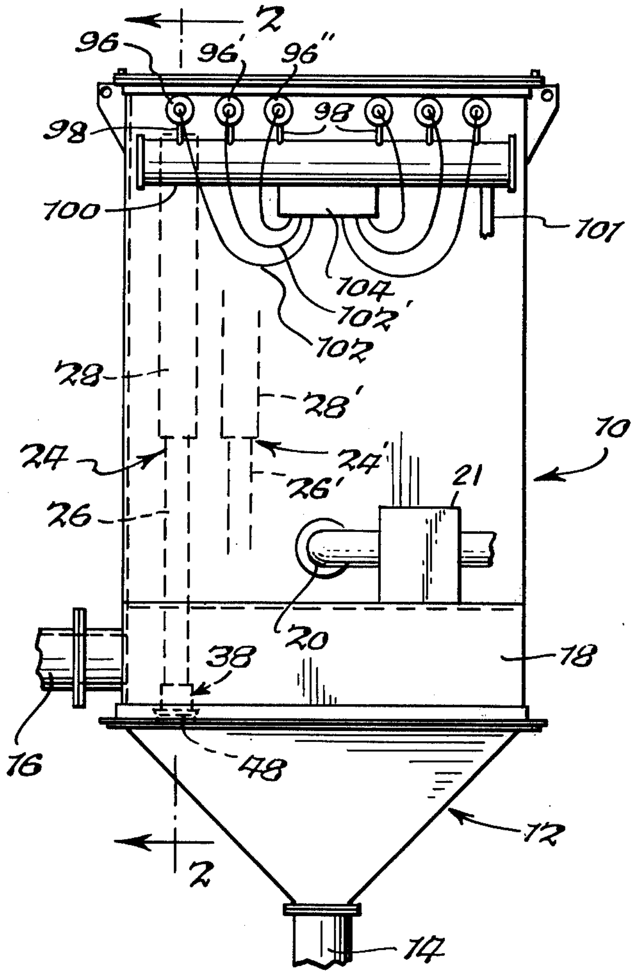
FIG. 1 is a side elevational view of an installation of apparatus according to the present invention.

Referring now to FIG. 1, the apparatus according to the present invention for separating particulate matter from a gas stream includes a housing having an upper portion generally designated 10, which preferably is hollow rectangular in shape, and a lower or hopper portion generally designated 12 which is defined by tapered sidewalls leading from the lower end of housing portion 10 to an outlet 14. The upper 10 and lower 12 housing portions are separated by a horizontally disposed tube sheet which will be shown in further detail presently. The apparatus further comprises an inlet conduit 16 for receiving dirty gas which is connected to one end of a duct 18 extending along the lower end of the upper housing portion 10. Duct 18 can be hollow rectangular in shape and is in fluid communication with the lower housing region 12 whereby the incoming gas stream flows first horizontally along conduit 16 and duct 18, is directed downwardly into housing portion 12, and then flows upwardly through the remainder of the apparatus in a manner which will be described in further detail presently. The apparatus also includes an outlet conduit 20 connected to the housing upper portion 10 and through which cleaned gas leaves the apparatus. Gas is moved through the apparatus from inlet 16 to outlet 20 by a motor driven fan 21 which preferably is connected to the outlet 20 in a known manner, the output of the fan being connected to a duct or conduit through which the cleaned gas is conveyed.

The apparatus of the present invention further comprises at least one dust collector unit generally designated 24 and comprising electrostatic precipitator means 26 and filter means 28 of foraminous material. Typically a plurality of units are included in the apparatus, an additional unit 24' including precipitator 26' and filter 28' being indicated in FIG. 1. The particular number of units is, of course, determined by the desired operating parameters of the installation. In each dust collector unit illustrated in FIG. 1, for example unit 24, the precipitator 26 is elongated and hollow having an inlet at one end which is connected to an aperture provided in the tube sheet separating the housing portions whereby the interior of the precipitator is in fluid communication with the lower housing portion 12. The inlet end of the precipitator is relatively rigidly secured in the tube sheet aperture, in a manner which will be described in detail presently, thereby providing support for the entire unit. The outlet of the precipitator is in fluid communication with an inlet or lower end of the filter means 28, the upper end of which is located near the upper end of housing portion 10. There is provided structural support for the unit adjacent the upper end in a manner which will be described in detail presently. The interior of the precipitator can be viewed as a charging zone for applying electrostatic charge to particles in the gas stream, i.e., dust particles, travelling through the precipitator and to the filter.

Figure 2:
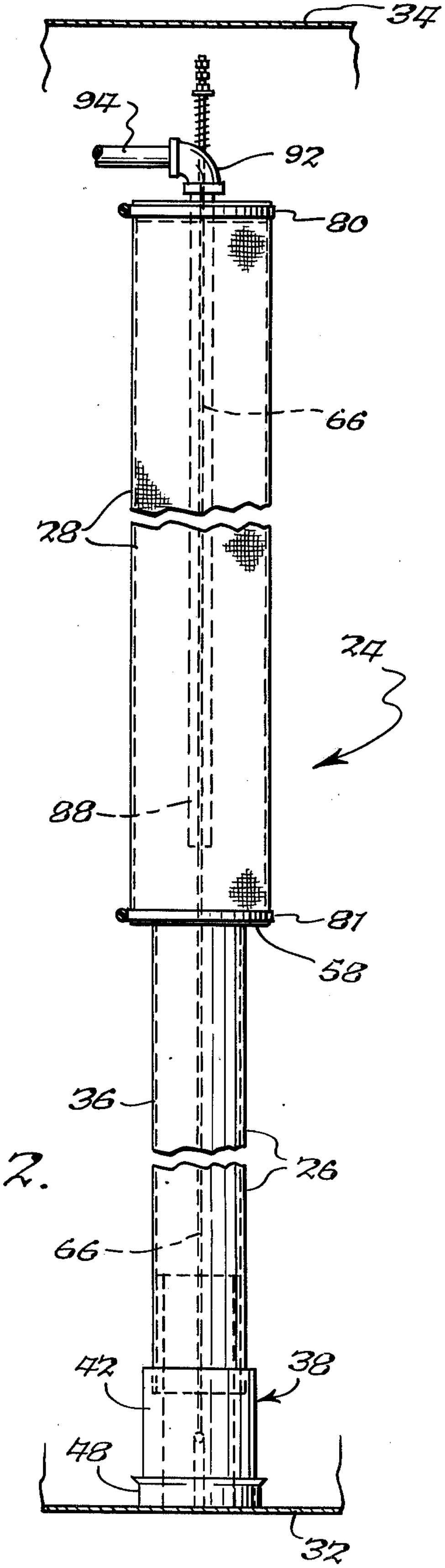
FIG. 2 is an enlarged vertical sectional view taken about on line 2—2 of FIG. 1 and showing apparatus according to the present invention for separating particulate matter from a gas stream.
Figure 3:
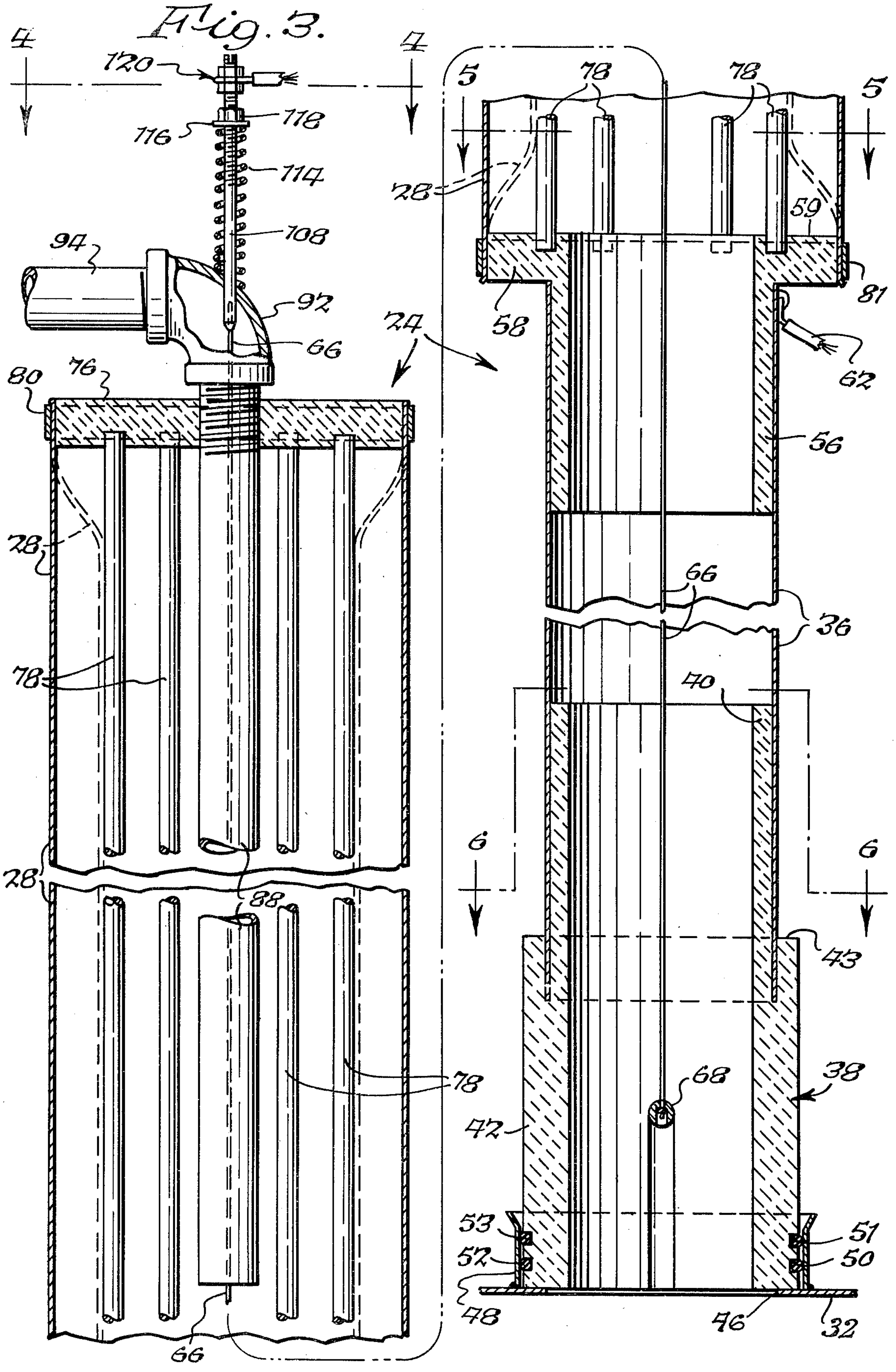
FIG. 3 is an enlarged vertical sectional view, with parts broken away and some parts shown in elevation, of the apparatus of FIG. 2.
Figure 4:
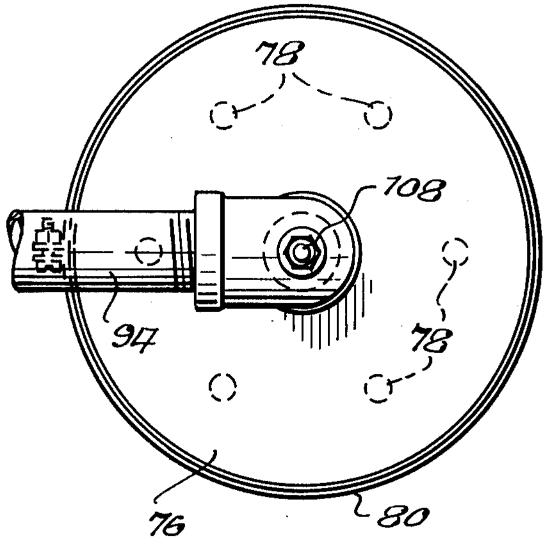
FIG. 4 is a plan view taken about on line 4—4 of FIG. 3.
Figure 7:
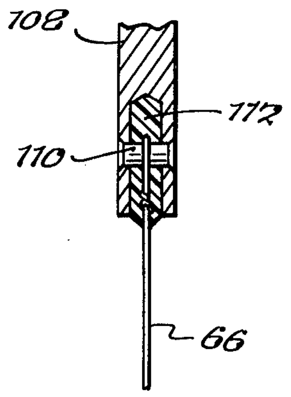
FIG. 7 is a fragmentary vertical sectional view illustrating the upper mounting arrangement for the corona wire in the apparatus of FIG. 3.
Figure 6:
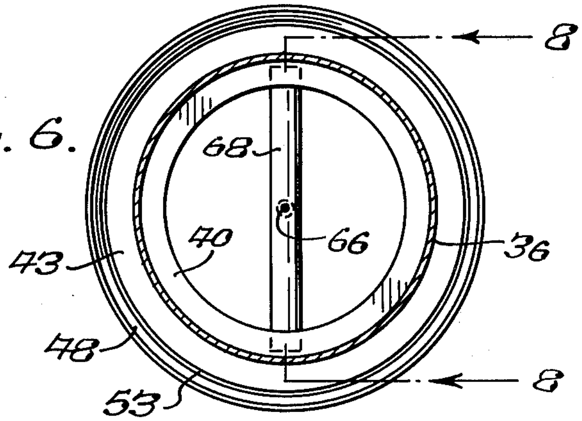
FIG. 6 is a sectional view taken about on line 6—6 of FIG. 3.

FIGS. 2-8 illustrate in further detail a single dust collector unit 24 including an electrostatic precipitator 26 and a filter means 28. As shown in FIG. 2, the unit 24 is disposed generally vertically within the housing 10 resting at the lower end thereof on a tube sheet element 32 and with the upper end thereof located slightly below a top wall 34 of the housing portion 10. Precipitator 26 is disposed generally vertically in the housing, is hollow, preferably generally cylindrical in shape, and is of the type wherein gas flows from the inlet at one end axially within and along the precipitator and through the outlet at the opposite end. Precipitator 26 includes a hollow collecting element in the form of a cylinder or tube 36 of electrically conducting material, preferably metal, and the sleeve 36 is fixed at one end thereof in a lower end insulator element 38 as shown in further detail in FIG. 3. In particular, the tubular of sleeve-like element 38 is of a relatively constant inner diameter along the axial length thereof and includes a first axial portion 40 having an outer diameter substantially equal to the inner diameter of the tubular collector element 36 and a second axial portion 42 having a larger outer diameter, the two portions meeting at an annular seat or edge surface 43 disposed in a plane generally perpendicular to the longitudinal axis of element 38 and located approximately midway along the axial length thereof. In the present illustration, the lower end of sleeve 36 fits snugly over the axial portion 40 and extends into an annular recess formed in the portion 42 adjacent the seat surface 43 for added stability. Thus sleeve 36 fits on insulator 38 in a manner providing a gas tight seal between the components which can be augmented if desired by sealant material. The axial end face of portion 42 of element 38 rests on and contacts tube sheet 32 in a manner surrounding an aperture or opening 46 provided in tube sheet 32 for this particular dust collector unit. As shown in FIG. 3, each aperture in the tube sheet 32 is provided with a sealing structure in the form of an upstanding annular element 48 fixed to sheet 32 and surrounding the opening 46, element 48 having an inner diameter greater than the diameter of opening 46. In addition, the inner diameter of element 48 is slightly greater than the outer diameter of the portion 42 of insulator element 38. A pair of axially spaced annular grooves 50 and 51 are provided on the outer surface of portion 42 located a distance from the end face thereof less than the axial length of element 48. Grooves 50 and 51 are provided with O-ring type sealing elements 52 and 53, respectively, seated therein and of a diameter sufficient to provide sealing contact with the inner surface of element 48 when the end portion 42 of insulator 38 is fitted therein as shown in FIG. 3.

Precipitator 36 further includes an upper end insulator element 56 which also is generally sleeve-like having an inner diameter substantially constant along the axial length thereof. Element 56 has an outer diameter substantially equal to the inner diameter of tube 36 whereby the outlet end of tube 36 is fitted over and along the element 56 as shown in FIG. 3. The upper end of element 56 is formed to include a radial flange portion 58 defining a planar axial end face 59. The end of tube 36 abuts against the opposite axial face of flange portion 58. A high voltage cable designated 62 is brazed or otherwise connected at one end to the outer surface of tube 36 adjacent the end abuting the radial flange of insulator element 56 and is provided with insulation of Teflon or similar material which is capable of withstanding voltages in the neighborhood of 50,000 volts. The end insulator elements 38 and 56 are of dielectric material such as a polyester laminate, and tube 36 preferably is of stainless steel.

Precipitator 26 further comprises an elongated corona electrode 66 located centrally of the collecting structure, preferably coincident with the longitudinal axis of the tube 36. The corona electrode 66 is in the form of a relatively thin wire, preferably of stainless steel, which is connected at the upper end as viewed in FIG. 2 in a manner which will be described in detail presently. The lower end of corona wire 66 as shown in FIG. 3 is fitted through an aperture provided in a rod element 68 of dielectric material. The end of wire 66 can be fixed to rod 68 in various ways, one of which is to provide a knot therein as detailed in FIG. 8 and fill the opening with a body 70 of sealant material such as silicone sealant material commercially available under the designation Dow Corning No. 732. The opposite ends of rod 68 fit in opposed longitudinal recesses 72 and 73 provided at diametrically opposite locations along the lower end of the insulator element 38, and the axially aligned ends or terminations of recesses 72, 73 abut the ends of rod 68 to hold or fix the rod against further axial upward movement as viewed in FIG. 3.

The filter means 28 of foraminous, dielectric material has the shape of a tube or sleeve which preferably is thin-walled and disposed with the longitudinal axis thereof coincident with the longitudinal axis of sleeve 36 of precipitator 26. The inlet or lower end of filter means 28 as shown in FIGS. 2 and 3 is in fluid communication with the upper or outlet end of the collector element 36 of precipitator 26. In the present illustration, precipitator 26 and filter 28 are in series flow relation. The outer diameter of the filter element 28 is slightly larger than the outer diameter of tube 36. Filter means 28 can comprise various types of foraminous or porous dielectric material such as woven, knitted or non-woved cloth or fabric, permeable membrane material, or fibrous material. The material of filter means 28, in addition to being foraminous and preferably dielectric, also should be relatively flexible for a reason which will be described presently. A type of woven cloth material found to serve satisfactorily as filter element 28 is commercially available from the DuPont Company under the designation Nomex Filter Media and having a weight of twelve ounces per square yard and a permeability of 30-50 cubic feet per minute per square foot at a pressure differential of one-half inch water. Various other fabrics which will not support combustion and satisfy the foregoing requirements along with certain fiberglass materials can be employed.

Figure 5:
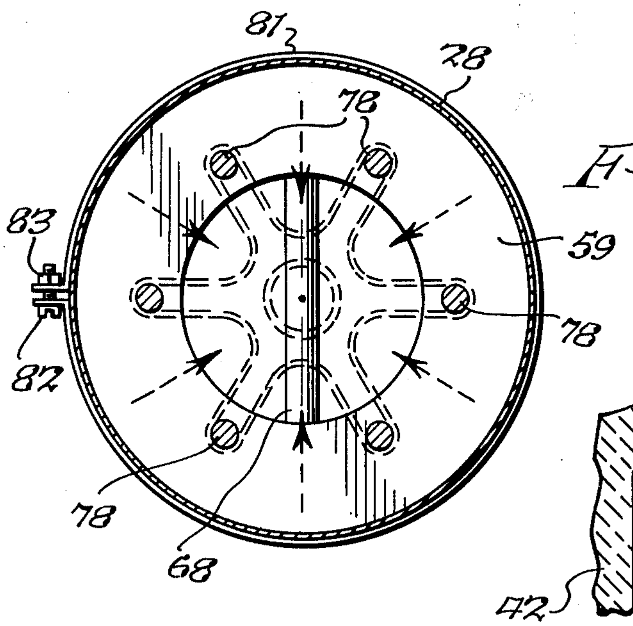
FIG. 5 is a sectional view taken about on line 5—5 of FIG. 3.
Figure 8:
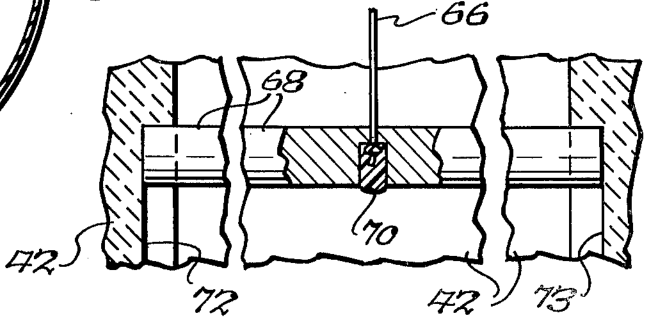
FIG. 8 is a fragmentary vertical sectional view illustrating the lower mounting arrangement for the corona wire in the apparatus of FIG. 3.

Filter means 28 is supported in the apparatus in the following manner. An end closure element 76 of dielectric material is supported in axially spaced vertical relation with respect to insulator 56 by a plurality of support rods 78 positioned between the elements 76 and 56. In particular, element 76 can be of the same dielectric material as elements 56 and 38, i.e. polyester laminate, and is generally disc-shaped. The inner axial end surface of element 76 is provided with circumferentially spaced bores or recesses located radially inwardly of the periphery of element 76 and extending a relatively small axial distance into the body of element 76. In the present illustration there are six recesses. In a similar manner, element 56 is provided with axially aligned recesses circumferentially spaced and located radially inwardly of the periphery of element 56 and radially outwardly of the axial passage therethrough. The support rods 78, in the present instance six in number, are fitted at opposite ends thereof into corresponding recesses in the elements 76 and 56 and sealed therein with suitable material such as epoxy cement. The filter means 28 then is fitted over and on the elements 76 and 56, the overall length of the assembly being determined primarily by the axial length of rods 78. The axial length of filter sleeve 28 is such that it terminates at opposite ends flush with the outer end face of insulator 76 and with the lower end face of the radial flange portion 58 of insulator 56. Each axial end of filter 28 is fastened to the corresponding insulator element 76, 56 by a pair of clamp assemblies including bands 80, 81 of metal such as stainless steel drawn tight around the peripheral surface of the corresponding insulator elements by a bolt and nut assembly 82, 83 tightening radial outward flanges of the band as shown in FIG. 5. Alternative arrangements for securing the filter element 28 in the assembly can of course be employed.

The apparatus of the present invention further comprises cleaning means for introducing a controlled quantity of high pressure gas at predetermined times adjacent the precipitator outlet and in a direction toward the precipitator inlet. The high pressure gas is introduced in a manner inducing a substantial flow of gas through and along within the filter element 28 toward the inlet thereof and then along within the collecting element of the precipitator in a direction from the precipitator outlet toward the precipitator inlet. This, in turn, serves to remove collected particulate matter from the surfaces of the filter element and the precipitator collecting element in a manner which will be described in further detail presently. The cleaning means comprises conduit means 88 for introducing the high pressure gas and which in the present instance is located within the filter means 28 and disposed or positioned so that the longitudinal axis of the conduit 88 and filter means 28 are coincident. The conduit 88 extends from the upper end of filter means 28 as viewed in FIGS. 2 and 3 axially downwardly along and within filter 28 and in the present illustration terminates a relatively small distance from the lower axial end of filter 28 which is adjacent the outlet of precipitator 26. The diameter of conduit 88 is relatively small, and in the present illustration the corona wire 66 extends along and within conduit 88 and is generally coincident with the longitudinal axis of conduit 8. The end closure element 76 is provided with a central aperture, and the upper end of conduit 88 is fitted snugly and tightly therein in a manner thus serving to fixedly mount conduit 88 in the apparatus. The upper end of conduit 88 extends axially beyond the outer end face of closure 76 for connection to a supply of high pressure gas in a manner which now will be described.

As shown in FIGS. 2 and 3, the upper end of conduit 88 threads into one end of an elbow 92, the other end of which is connected to one end of a feed or supply conduit 94. In an installation such as that shown in FIG. 1 including a plurality of dust collector units 24, there will be a corresponding plurality of feed or supply conduits similar to conduit 94, one for each dust collector unit. Conduit 94 is connected in fluid communication with the outlet of a valve 96, the inlet of which is connected by a conduit 98 to a header or manifold 100 fixedly mounted to housing 10 adjacent the upper end thereof as shown in FIG. 1. Manifold 100 is connected by a conduit 101 to a source or supply of high pressure such as compressed air. There are additional valves, for example those designated 96′ and 96″ in FIG. 1, and corresponding conduits similar to conduit 98 for connection to manifold 100, the particular number being determined by the number of dust collector units included within a given installation. In some instances, where a large number of units are included, it may be feasible to connect two feed conduits 94 through a single valve to the manifold 100 whereby cleaning of two units is done simultaneously. Valve 96 is connected by a control line 102 to a control assembly 104 which is fixedly mounted to the manifold 100. The control 104 serves to provide the proper timing relationship for the valves as will be described in detail presently. Additional lines are provided for the additional valves included in the installation.

Corona wire 66 is fixedly mounted at the upper end of the assembly in the following manner. Wire 66 is fixedly connected to one end of a connector element in the form of a metal rod 108, preferably of stainless steel, which extends through an opening provided in elbow 92 and is disposed generally vertically as shown in FIGS. 2 and 3. One method of securing wire 66 to rod 108 is detailed in FIG. 7. The end of wire 66 is provided with a loop which is inserted into a slot provided at the end of rod 108 and a bolt or rivet-like element 110 is inserted therethrough with both ends being peened over and smoothed where upon a quantity 112 of sealant such as a silicon sealant commercially available under the designation Dow Corning No. 732 is filled in the slot. The exposed end of rod 108 is provided with a coil spring 114 fitted circumferentially thereon, and a washer, nut combination 116, 118 is connected on the threaded end of rod 108 and tightened up against spring 114 so that the opposite end of spring 114 contacts elbow 92 for the purpose of adjusting the tension in wire 66. An electrical cable 120 insulated in a manner similar to that of cable 62 is connected to the rod or connector element 108 at the outer end thereof between a pair of nuts threaded thereon in a conventional manner.

By way of example, an installation was constructed wherein for each dust collector unit 24 the precipitator collector element 36 had an overall length of about 40 inches, an outer diameter of about 4 inches and a wall thickness of about 0.35 inch. Filter element 28 had an overall length of about 49 inches and an inner diameter of about 6 inches. Conduit 88 was of stainless steel having an inner diameter of about $\frac{3}{8}$ inch and an overall length such that it terminates about 6 inches above the upper surface of insulator element 56 as viewed in FIGS. 2 and 3. Corona wire 66 can have a diameter of about 0.031 inch and be of stainless steel.

The apparatus of the present invention operates in the following manner. The operation of a single dust collector unit 24 will be described, it being understood that the same operation occurs for each unit in a multiple unit installation as shown in FIG. 1. Dirty gas is introduced to the apparatus through inlet conduit 16 and duct 18 and is moved by operation of the fan through electrostatic precipitator means to collect a major portion of the particulate matter from the gas stream. In particular, the gas to be cleaned flows from duct 18 first downwardly into hopper portion 12 and then upwardly through aperture 46 in tube sheet 32 into the precipitator 26 at the bottom thereof as viewed in FIGS. 1–3. The gas flows axially within precipitator 26 along the entire length of tube 36. The corona electrode 66 is maintained at a negative potential with respect to tube 36, and tube 36 is maintained at a positive potential with respect to electrode 66. In a dust collector having dimensions according to the example hereinabove, the potential difference would be about 40,000 volts and the corona current about 5 milliamperes, and effective operation results when the power supply provides a filtered d.c. voltage. Furthermore, the relative polarities of corona electrode 66 and collector 36 can be changed. Having corona electrode 66 at a negative potential with respect to tube 36 is preferred because it has been found to provide a more stable corona at a relatively larger current to provide more efficient dust collection.

Dust particles and other particulate matter entering precipitator 26 are charged in the corona current and a major portion of the charged particles is collected on the inner surface of collector element 36. In particular, the particulate laden gas passes upward parallel to corona discharge wire 66 where the particles become charged, and then the charged particles are attracted to and become deposited on the metal tube 36 which is charged to a polarity opposite that of corona wire 66. The gas is moved by the fan through precipitator 26 and then out the end adjacent insulator 56 into filter 28. Filter 28 is electrically insulated from precipitator 26 so as to be electrically neutral. That is, there is no electric field applied to the cylindrical filter element 28. The charged dust particles and other particulate matter collect on the inner surface of filter element 28 with the result that the filter removes the remainder of the particulate matter from the gas stream. Clean gas then is withdrawn from filter 28 by the fan and leaves the apparatus through outlet 20. While gas is moved through the apparatus by a fan connected to the outlet 20 which serves to draw gas through the apparatus in the present illustration, the gas could be moved by a fan connected to inlet 16 which would force or propel gas through the apparatus.

In the method and apparatus according to the present invention, depositing the charged dust particles on a fabric filter element with no external electric field applied to the fabric filter results in enhanced collection efficiency and much increased throughput. In particular, when no high voltage is applied to the precipitator 26 so that the dust particles entering filter 28 are uncharged, the fabric filter behaves as a conventional, continuous cleaning, pulse type baghouse. This behavior remains constant as voltage is increased, until the corona discharge onset voltage is reached. Once a corona is generated and particles are charged, a sudden change in filtration resistance, in particular a sudden pressure drop, takes place. This decrease in resistance continues as voltage is increased because the dust particles become more highly charged and because more particles are deposited on the metal tube 36.

By comparing a plot of fabric pressure drop vs. air cloth ratio or filtration rate for electrostatic operation to a plot of the same parameters without electrostatic operation, i.e. with the high voltage on and the voltage off, in the apparatus of the present invention, it was determined that at an equivalent pressure drop, the application of electrostatic charge to the particles with no electric field applied to the fabric filter gives rise to a four fold increase in filtration rate per unit fabric area. In addition, moving electrically charged particles toward an uncharged fabric filter according to the method of the present invention results in the particles approaching the filter relatively softly or gently so that the particles are collected on the fabric filter surface rather than being embedded therein thereby facilitating subsequent cleaning of the filter. The dielectric nature of the filter material is believed to contribute to this result.

Periodically, the deposited particulate material is cleaned from the inner surfaces of tube 36 and fabric filter 28 by means of a short burst of compressed air emanating from the pipe 88. This jet of primary air entrains and mixes with the induced or secondary air flow, and this secondary flow, reverse with respect to the filtering, of air through the fabric 28 and down along precipitator tube 36 from outlet to inlet dislodges the accumulated particulate layer on both elements. In particular, the flexible fabric filter element 28 is drawn abruptly inwardly as indicated by the broken lines in FIGS. 3 and 5 and against the support rods 78. The arrows in FIG. 5 indicate the direction of the reverse flow of air causing the inward movement of filter 28. The abrupt inward flexing of fabric filter 28 together with the induced reverse flow dislodges collected dust particles from the inner surface thereof, and the dislodged particles fall down through filter 28, precipitator 26, housing portion 12 and outlet 14 to a hopper or suitable collector. The force of the induced reverse flow of air in a downward direction enhances the foregoing and also serves to dislodge particulate matter from the inner surface of tube 36 which then also falls down through precipitator 26, housing portion 12 and outlet 14. Introducing the jet of air or other gas in this manner provides a pump-like or fan-like effect cleaning the inner surfaces of the filter and precipitator collector electrode.

In a typical installation including a plurality of dust collector units 24, each unit is cleaned about once every four minutes. The air pressure employed is generally in the range from about 60 psig. to about 80 psig., and the jet or pulse of air or gas from conduit 88 typically has a duration of about 0.3 second and a magnitude of about 1.5 standard cubic feet of air. The full cleaning cycle for each dust collector unit is accomplished in about one second. In an installation of a number of units or cartridges 24, for example as shown in FIG. 1, the exact number of units and hence the size of the housing depends of course on the flow rate of gas which must be filtered. In such an installation, only a small fraction of the total number of units is cleaned at one time, and therefore the operation of the installation is not interrupted for cartridge cleaning. In other words, there is no need to provide any isolation structure for the dust collection units or groups thereof. The outlet or nozzle end of conduit 88 alternatively may be located within precipitator 26, preferably near the outlet thereof. The outlet or nozzle of conduit 88 must be located so that the pulse or jet of gas issuing therefrom induces a flow which draws or pulls filter 28 inwardly rather than expanding the filter 28. In the present illustration, locating a portion of the length of corona wire 66 within conduit 88 may cause vibration of wire 66 when the jet of gas is introduced by conduit 88 which, in turn, can clean the wire.

Figure 9:
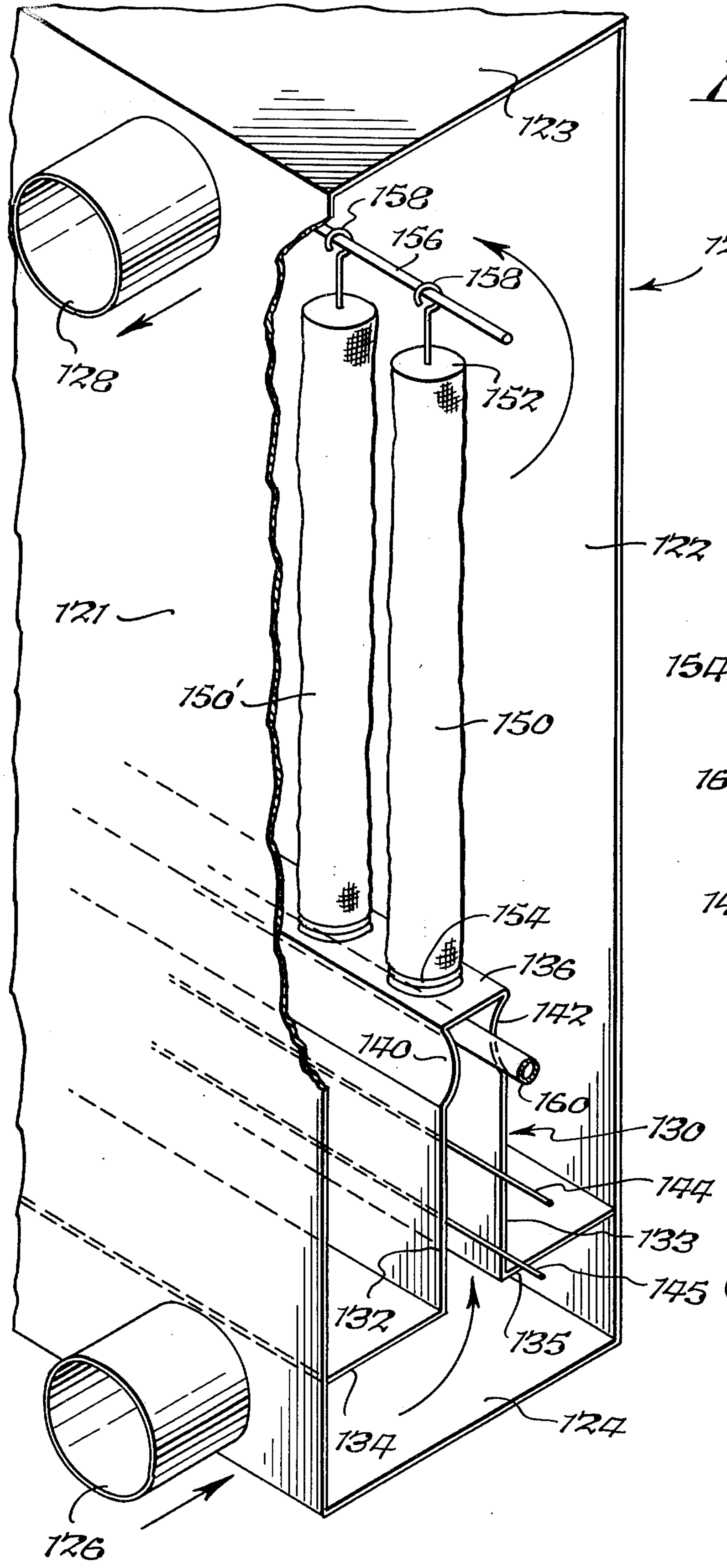
FIG. 9 is a fragmentary perspective view with parts removed illustrating apparatus according to another embodiment of the present invention.

FIG. 9 illustrates apparatus according to another embodiment of the present invention. A hollow, generally rectangular housing designated 120 has opposed sidewalls 121, 122, a top 123 and a base or bottom wall 124, and housing 120 is provided with a dirty gas inlet 126 and a clean gas outlet 128. Located within housing 120 is an electrostatic precipitator means generally designated 130 and including opposed sidewalls 132, 133 joined by opposite end walls. The precipitator sidewalls 132 and 133 have outwardly directed extensions 134 and 135, respectively which join the housing sidewalls 121 and 122, respectively. The precipitator is open at the lower end as viewed in FIG. 9 defining an inlet which is in fluid communication with the dirty gas inlet 126. The precipitator also includes a top wall 136 provided with at least one aperture defining the precipitator outlet. An annular rim 138 surrounds the aperture. The sidewalls are formed to include inwardly curved surface portions 140 and 142 which serve to provide a constriction to define a Venturi region adjacent the outlet end of the precipitator. In the present illustration, precipitator 130 includes a pair of corona wires 144, 145. An electrical potential difference is maintained between electrodes 144, 145 in contrast with the preceding embodiment.

The apparatus further comprises filter means 150 of foraminous material similar to filter 28 in the apparatus of FIGS. 1–8 and positioned in housing 120 with the inlet thereof in fluid communication with the precipitator outlet. In the present illustration, two filters designated 150 and 150′ are shown in FIG. 9 and each of the filters 150, 150′ is generally hollow cylindrical in shape, preferably being of flexible fabric material which can be the same as that of filters 28 in FIGS. 1–8, and is closed at the top by a closure element 152. Each filter is secured at the lower end thereof to precipitator 130 by a clamp 154 fastening it to rim 138 and is held in an upright vertical position by connection through a bracket 158 to a suitable supporting element such as a horizontally disposed rod 156 located in the upper portion of housing 120.

The apparatus further comprises cleaning means in the form of a conduit designated 160 which extends into precipitator 130 in a direction along and adjacent the top surface 136. Conduit 160 in the present instance is disposed generally perpendicular to the direction of the gas stream traveling along the precipitator 130. Conduit 160 is located downstream of the narrow portion of the Venturi passage and adjacent the precipitator outlet. One end of conduit 160 is connected to a source of high pressure gas such as compressed air in a manner similar to that of the embodiment of FIGS. 1–8 with suitable flow apparatus operatively connected between conduit 160 and the source. A plurality of orifices 162 is provided in conduit 160, the nozzle-like apertures 162 being in spaced location along conduit 160 and being located so as to be directed toward the inlet end of the precipitator.

In operation, dirty gas is introduced to the apparatus through inlet 126 and is moved by operation of a fan (not shown) which for example would be operatively connected to outlet 128 in a manner similar to the preceding embodiment. The gas is moved through precipitator 130 as indicated by the arrows in FIG. 9 to collect a major portion of the particulate matter from the gas stream. The Venturi region in precipitator 130 increases the velocity of the dirty gas which is desirable in some situations. Precipitator 130 is operated in a manner generally similar to precipitator 26 in FIGS. 1–8. The gas is moved further by the fan through precipitator 130 and then into the filters 150 which are electrically neutral, i.e. no electric field is applied thereto. The charged dust particles and other particulate matter collect on the inner surfaces of filters 150 which remove the remainder of the particulate matter from the gas stream in a manner similar to filter 28 in FIGS. 1–8. Clean gas then is withdrawn from filters 150 by the fan and leaves the apparatus through outlet 128.

Figure 10:
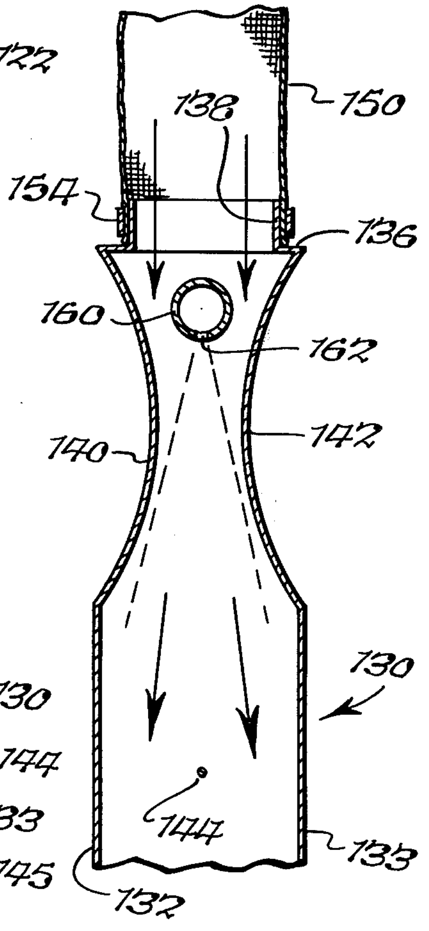
FIG. 10 is a fragmentary vertical sectional view of the apparatus of FIG. 9.

Periodically, the deposited particulate material is cleaned from the inner surfaces of precipitator 130 and fabric filters 150 by means of a short burst of compressed air emanating from each of the nozzle-like openings 162 of conduit 160. The jets of primary air entrain and mix with a secondary air flow and this resulting secondary or reverse flow of air through the fabric filters 150 and downward along precipitator 130, as indicated by the arrows in FIG. 10, dislodges the accumulated particulate layer on both elements in a manner similar to the apparatus of FIGS. 1–8. The Venturi region in precipitator 130 increases the velocity of cleaning air which is desirable in situations where the nature of the material of filters 150 calls for high velocity flow. The dislodged particulate material falls into the lower region of housing 120 and can be removed in a suitable manner.

It is therefore apparent that the present invention accomplishes its intended objects. While embodiments of the present invention have been described in detail this is for the purpose of illustration, not limitation.

We claim:

1. Apparatus for separating particulate matter from a gas stream comprising:

(a) a housing having an inlet for receiving gas from said stream containing said particulate matter and an outlet;

(b) electrostatic charging means within said housing, said charging means having an inlet communicating with said gas inlet and an outlet, said charging means including means for applying electrostatic charge of one polarity to the particulate matter in said gas stream, said charging means being hollow, elongated in shape and said inlet and outlet being located at opposite ends thereof;

(c) an electrically neutral fabric filter element within said housing and in fluid communication with the outlet of said charging means said filter element being hollow, elongated in shape and having an inlet at one end thereof operatively connected to said outlet of said charging means; and (d) means operatively associated with said housing for moving said gas from said gas inlet through said electrostatic charging means and said filter element and to said housing outlet.

2. Apparatus according to claim 1, wherein said electrostatic charging means comprises an electrostatic precipitator.

3. Apparatus according to claim 1, wherein said fabric filter element is of dielectric material.

4. A method of separating particulate matter from a gas stream comprising:

(a) moving gas from said stream containing said particulate matter through a hollow, elongated electrostatic charging zone from an inlet at one end thereof to an outlet at the opposite end thereof and applying unipolarity voltage to said zone to apply the same polarity electrostatic charge to each of the particles of said particulate matter in the gas stream;

(b) moving said gas from said charging zone immediately to an electrically neutral, hollow and elongated fabric filter element and through said electrically neutral fabric filter element in a manner such that the electrically charged particulate matter is deposited on said filter element, said filter element having an inlet at one end thereof connected to said outlet of said charging zone; and (c) withdrawing clean gas from said filter element.

5. A method according to claim 4, wherein said electrostatic charging zone is provided by an electrostatic precipitator which removes a portion of the particulate matter from the gas stream.

6. A method according to claim 4, wherein said fabric filter element is of dielectric material.

7. Apparatus for separating particulate matter from a gas stream comprising:

(a) a housing having an inlet for receiving gas from said stream containing said particulate matter and an outlet;

(b) an electrostatic precipitator within said housing, said precipitator comprising a hollow and elongated collecting element having an inlet at one end thereof communicating with said gas inlet and an outlet at the opposite end thereof and electrode means within said collecting element;

(c) a hollow, elongated filter element of flexible foraminous material within said housing having an inlet at one end thereof operatively connected to the outlet of said precipitator collecting element, said filter element being electrically neutral;

(d) means operatively associated with said housing for moving said gas from said gas inlet through said precipitator collecting element and said filter element and to said housing outlet;

(e) cleaning means for introducing a controlled quantity of high pressure gas at predetermined times adjacent said precipitator outlet and in a direction toward said precipitator inlet in a manner inducing a substantial flow of gas from said gas stream along said collecting element in a direction from said precipitator outlet toward said precipitator inlet to remove collected particulate matter from said collecting element, said cleaning means including means for directing said controlled quantity of high pressure gas generally centrally and longitudinally of said collecting element; and (f) said directing means of said cleaning means being located relative to said outlet of said precipitator collecting element and to said filter element inlet such that said flow of gas induced by said cleaning means causes said filter element to be flexed inwardly and abruptly thereby dislodging collected particulate matter from the surface of said filter element.

8. Apparatus according to claim 7, wherein said directing means comprises conduit means having an outlet at one end, a source of compressed air operatively connected to said conduit means at the other end, and control means operatively connected between said compressed air source and said conduit means, said conduit outlet being located adjacent said precipitator outlet.

9. Apparatus according to claim 7, wherein said precipitator collecting element is shaped to include a constriction adjacent the outlet thereof defining a Venturi region.

10. Apparatus according to claim 7, wherein said directing means comprises conduit means having an outlet at one end, a source of compressed air operatively connected to said conduit means at the other end, and control means operatively connected between said compressed air source and said conduit means, said conduit outlet being located adjacent said inlet of said filter element and disposed toward the inlet of said precipitator in a manner such that said induced flow of gas causes said filter element to be drawn inwardly.

11. Apparatus according to claim 7, wherein said precipitator collecting element is of material which is impervious to gas.

12. Apparatus according to claim 7, wherein said directing means defines an outlet having a size relatively small with respect to the cross-section of said collecting element for directing said controlled quantity of high pressure gas in the form of a jet.

13. A method of separating particulate matter from a gas stream comprising:

(a) moving said gas containing said particulate matter through a hollow, elongated electrostatic precipitator from an inlet at one end thereof to an outlet at the opposite end thereof to collect a portion of the particulate matter from the gas stream;

(b) moving said gas from said precipitator through a hollow, elongated filter element of flexible foraminous material to collect the remainder of the particulate matter from the gas stream, said filter element having an inlet at one end thereof operatively connected to said outlet of said precipitator and said filter element being electrically neutral;

(c) withdrawing clean gas from said filter element; and (d) introducing a controlled quantity of high pressure gas at predetermined times at a location such that substantially all of said high pressure gas is introduced into said precipitator adjacent said precipitator outlet and in a direction so as to induce a substantial flow of gas from said gas stream through said filter element causing said filter element to be flexed inwardly and abruptly and from said filter element through said precipitator to remove collected particulate matter from said filter element and from said precipitator.

14. Apparatus for separating particulate matter from a gas stream comprising:

(a) a housing having an inlet for receiving gas from said stream containing said particulate matter and an outlet;

(b) electrostatic charging means within said housing, said charging means having an inlet communicating with said gas inlet and an outlet, said charging means including means for applying electrostatic charge to the particulate matter in said gas stream, said charging means being hollow, elongated in shape and said inlet and said outlet being located at opposite ends thereof;

(c) a fabric filter element within said housing in fluid communication with the outlet of said charging means, said filter element being hollow, elongated in shape and having an inlet at one end thereof in fluid communication with said outlet of said charging means;

(d) an element of electrical insulating material operatively connected to the inlet of said fabric filter element and to the outlet of said charging means; and (e) means operatively associated with said housing for moving said gas from said gas inlet and through said electrostatic charging means and said filter element and to said housing outlet.

* * * * *